INVENTOR.
RAY L. RILEY,
BY
Walter J. Adam
ATTORNEY.

INVENTOR.
RAY L. RILEY,
BY
Walter J. Adam
ATTORNEY.

United States Patent Office 3,109,945
Patented Nov. 5, 1963

3,109,945

TUNNEL DIODE FLIP FLOP CIRCUIT FOR PROVIDING COMPLEMENTARY AND SYMMETRICAL OUTPUTS

Ray L. Riley, Los Angeles, Calif., assignor to Hughes Aircraft Company, Culver City, Calif., a corporation of Delaware Filed Oct. 23, 1961, Ser. No. 146,897
2 Claims. (Cl. 307—88.5)

This invention relates to bistable circuits and particularly to a high speed symmetrical flip flop circuit utilizing negative resistance elements.

Bistable devices utilizing negative resistance elements have advantages of simplicity, relatively high speed and compatibility with goals of micro-miniaturization. Conventional binary state devices utilizing negative resistance devices and capable of operating at relatively high pulse repetition rates have an unsymmetrical circuit configuration, that is, a single input and a single output. For use as a flip flop circuit in computer systems, for example, a circuit that has a pair of input terminals and a pair of output terminals conforms most readily to conventional logical operations. Another disadvantage of conventional binary state devices utilizing negative resistance devices is that the pulse rate of operation is limited because an inductor is provided in which current must change direction when the device changes state.

It is therefore an object of this invention to provide a bistable circuit utilizing negative resistance devices and operating at a very high pulse repetition rate.

It is a further object of this invention to provide a bistable flip flop circuit utilizing negative resistance devices that has a symmetrical circuit configuration.

It is another object of this invention to provide a simplified and reliable flip flop circuit utilizing semiconductor elements.

It is still another object of this invention to develop a bistable flip flop circuit utilizing tunnel diodes and capable of operating at very high pulse rates.

Briefly, in accordance with this invention, a bistable flip flop circuit includes first and second parallel current paths each including an impedance means, a negative resistance device and a switching means coupled in series. The parallel paths are coupled to a constant current source. In response to trigger pulses, applied selectively to the first or second path, the current through the negative resistance devices is changed so that the selected one is triggered to a high voltage state and the other to a low voltage state. The voltage states of the negative resistance devices are applied to separate output leads to form a symmetrically arranged high speed flip flop circuit.

The novel features of this invention, as well as the invention itself, will best be understood from the accompanying description taken in connection with the accompanying drawings, in which like characters refer to like parts, and in which.

Figure 1:
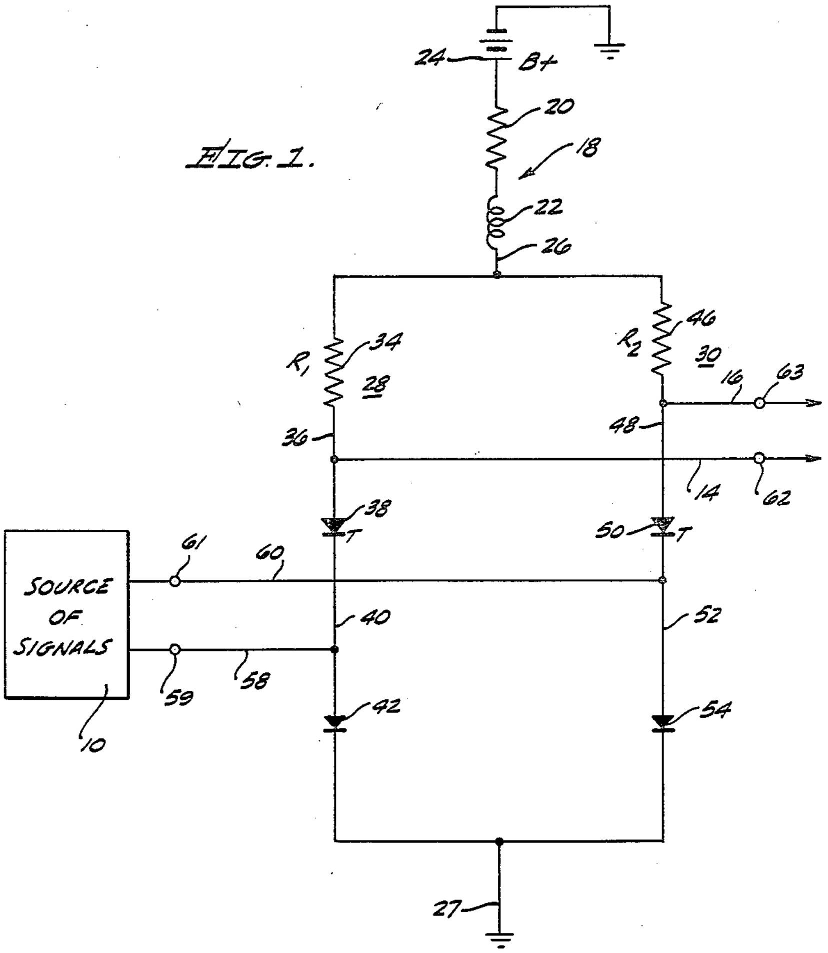
FIG. 1 is a schematic circuit diagram of a flip flop circuit in accordance with this invention.

Referring first to the circuit diagram of FIG. 1, the flop circuit in accordance with this invention responds to a source of trigger signals or pulses 10 to be triggered to a first or a second binay state for developing output pulses on leads 14 and 16. A substantially constant source of current 18 includes a resistor 20 and an inductor 22 coupled in series between a source of positive B+ potential such as a battery 24 which in turn is coupled to ground, and a lead 26. The inductor 22 has a value to effectively limit current changes from a desired constant current. It is to be noted that the resistor 20 may not be required in the current source 18, but provides a greater degree of stability to the circuit. A first current path 28 and a second current path 30 are coupled between the lead 26 and a lead 27 which in turn is coupled to ground. The first path 28 includes a resistor 34 having a resistance of $R_1$ coupled between the lead 26 and a lead 36, a negative resistance device such as a tunnel diode 38 having an anode to cathode path coupled between the lead 36 and a lead 40, and a switching diode 42 having an anode to cathode path coupled between the lead 40 and the lead 27. The current path 30 includes a resistor 46 providing resistance of $R_2$ coupled between the lead 26 and a lead 48, a negative resistance device such as a tunnel diode 50 having an anode to cathode path coupled between the lead 48 and a lead 52 and a switching diode 54 having an anode to cathode path coupled between the leads 52 and 27. The switching diodes 42 and 54 may be conventional fast recovery junction diodes, for example. A first input lead 58 is coupled to the source of pulses 10 through a terminal 59 and to the lead 40 and a second input lead 60 is coupled to the source of pulses 10 through a terminal 61 and to the lead 52. The output lead 14 is coupled from an output terminal 62 to the lead 36 and the output lead 16 is coupled from an output terminal 63 to the lead 48.

Figure 2:
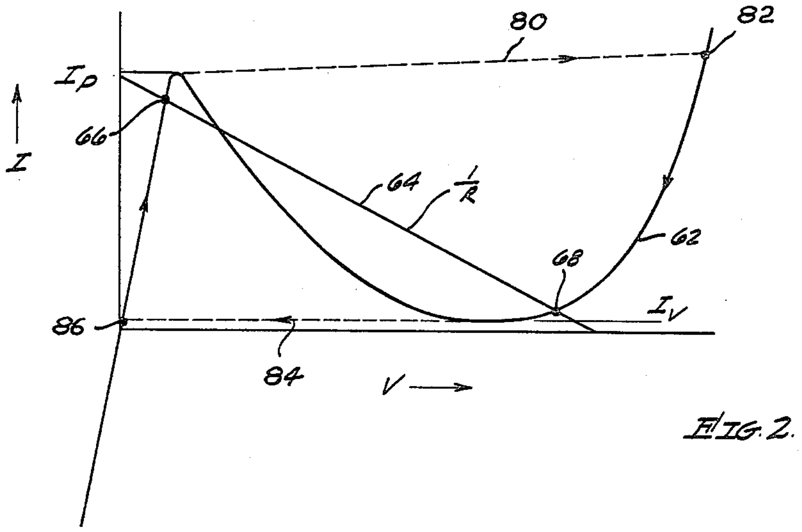
FIG. 2 is a graph of current versus voltage for explaining the operation of the flip flop circuit of FIG. 1.
Figure 3:
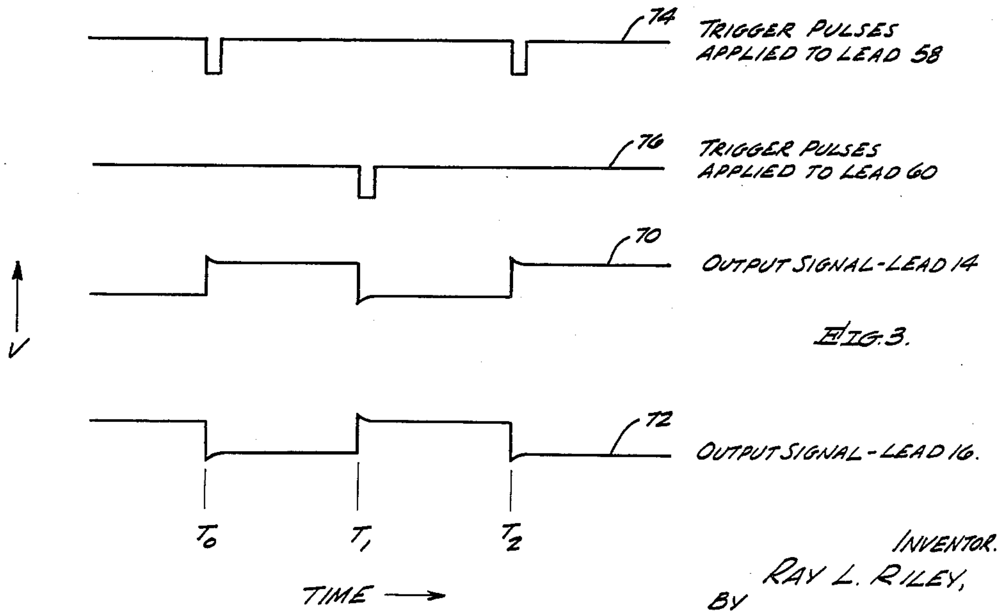
FIG. 3 is a diagram of waveforms for further explaining the operation of the flip flop circuit of FIG. 1.

Referring now also to FIG. 2, a curve 62 shows the operating characteristics of either of the tunnel diodes 38 or 50. A load line 64 is shown having a slope $1/R$ which represents a slope $1/R_1$ for the tunnel diode 38 and a slope $1/R_2$ for the tunnel diode 50. In operation, one tunnel diode is normally at a stable low voltage state of a point 66 and the other tunnel diode is at the stable high voltage state of a point 68. Assuming that initially the tunnel diode 38 is maintained at the state 66, the signal applied to the lead 14 is at a low voltage level as shown by a waveform 70 of FIG. 3 prior to a time $T_0$. At the same time the tunnel diode 50 is stably maintained at the state 68 to apply a high voltage signal of a waveform 72 to the output lead 16. In this stable condition prior to the time $T_0$ a relatively large current slightly less than the peak current $I_P$ is flowing through the tunnel diode 38 and a relatively small current slightly greater than the valley current $I_V$ is flowing through the tunnel diode 50 as determined by the values $R_1$ and $R_2$ of the respective resistors 34 and 46.

At time $T_0$ a negative trigger signal or pulse of a waveform 74 is applied on the lead 58 to the lead 40 to increase the current flowing through the tunnel diode 38. In order that the signal of the waveform 74 is effective, the switching diode 42 is biased out of conduction. Thus, the current flowing from the source 18 is temporarily increased through the tunnel diode 38 above the peak current $I_P$. The current flows into the source 10 as the switching diode 42 is biased out of conduction during the time of occurrence of the pulse of the waveform 74. As a result, the tunnel diode 38 is triggered to another state along a dotted path 80 to a high voltage point 82 on the characteristic curve 62. Also, because the current has increased through the tunnel diode 38 and the source 18 is essentially a constant current source, the current flowing through the tunnel diode 50 decreases below the valley current $I_V$. Thus, substantially simultaneous with the change of state of the tunnel diode 38, the tunnel diode 50 changes state along a dotted path 74 to a low voltage point 86.

At the termination of the negative pulse of the waveform 74 shortly after time $T_0$, the current flowing through the tunnel diode 38 decreases so that the operating state of the tunnel diode 38 moves down the characteristic curve 62 to the stable high voltage state 68. The relatively low current at the point 68 then flows through the switching diode 42. In response to this decrease of current through the tunnel diode 38 after removal of the pulse, the current flowing through the tunnel diode 50 increases so that the operating point of the tunnel diode 50 rises along the curve 62 to the stable low voltage point 66. The result of these changes of state is that a high voltage state of the waveform 70 is applied to the lead 14 and a low voltage state of the waveform 72 is applied to the lead 16. Because of the slight change of voltage at the termination of the trigger pulse of the waveform 74, the signal of the waveform 70 on the lead 14 falls slightly and the signal of the waveform 72 rises slightly. However, this small change of voltage is not of sufficient magnitude or length of time to affect the utility of the output signals. Thus, the flip flop circuit has been triggered to the opposite state at time $T_0$ so that the voltage on the lead 14 has changed from a low to a high level and the voltage on the lead 16 has changed from a high to a low level in response to a trigger pulse of the waveform 74. This stable binary state is maintained until the flip flop circuit is again triggered to the opposite state.

At time $T_1$, a negative trigger pulse of a waveform 76 is applied from the source 10 through the lead 60 to the lead 52 biasing the switching diode 54 out of conduction. As a result, increased current flows through the tunnel diode 50 into the source 10. The current flowing through the tunnel diode 50 which is initially at the high current state of point 66, increases above the peak current $I_P$ and the tunnel diode 50 is triggered to change state along the path 80 to the state of the point 82. Also, because of the increase of current flowing through the tunnel diode 50 from the constant current source 18, the current flowing through the tunnel diode 38 decreases below the valley current $I_V$ and the tunnel diode 38 changes state along the path 84 to the low voltage state of the point 86. As discussed above, the current source 18 is effectively a constant current source so that an increase of current in the path 30 decreases the current in the path 28. It is to be noted that the source of signals 10 may be timed or controlled by a computer system, for example.

Shortly after time $T_1$ when the negative trigger pulse or signal of the waveform 76 rises, and the diode 54 is biased into conduction, the tunnel diode 50 changes state down the curve 62 to the high voltage stable operating point 68. Also at the same time, the diode 38 changes state from the point 86 along the curve 62 to the stable low voltage state of the point 66. Thus, the flip flop circuit in accordance with this invention has been triggered to the second binary state with the voltage on the output lead 14 changing from a high level to a low level and the voltage on the output lead 16 changing from a low level to a high level in response to the trigger signal of the waveform 76.

In a similar manner to the discussion above, a negative trigger signal or pulse may be applied to the lead 40 at a time $T_2$ and the tunnel diode 38 is triggered to the high voltage state and the tunnel diode 50 is triggered to the low voltage state. At the termination of the pulse of the waveform 74 the tunnel diodes 38 and 50 are maintained at respective points 68 and 66.

If the current source 18 does not limit the current, the circuit may have abnormal states when both of the tunnel diodes 38 and 50 are in the same state, that is, both operating at the points 66 or 68. However, the resistor 20 limits the current which may flow through the inductor 22 so that the tunnel diodes cannot both be in the state of the point 66. These abnormal states may be caused by transient signals on the leads 58 and 60 and do not affect the normal operation. The circuit returns to the normal states upon being triggered by a trigger pulse such as shown by the waveforms 74 and 76.

Because of the high speed of operation of the tunnel diodes and the absence of reactive elements or energy storage problems, the flip flop circuit of the invention may be operated or triggered at a very high pulse repetition rate. The inductor in the current source 18 does not affect the operating speed. The trigger pulses of the waveforms 74 and 76 may be relatively short duration spikes if desired. Another advantage of the flip flop circuit of the invention is that with a constant current flowing through the two paths 28 and 30, the circuit has a relatively small power loss. Because of the symmetrical configuration, the flip flop circuit of this invention is highly adaptable to conventional computer systems.

Thus, there has been described a high speed bistable flip flop circuit that has a symmetrical circuit configuration. The circuit requires a minimum number of components and only two active elements which are negative resistance devices. The flip flop circuit has the further advantages of requiring a relatively small amount of power.

What is claimed is:

1. A flip flop circuit responsive to a signal applied to a first or a second input terminal to apply signals to first and second output terminals comprising a conductive element, a source of substantially constant current having one terminal coupled to said conductive element, first and second resistors, first and second tunnel diodes each having an anode to cathode path, first and second switching diodes each having an anode to cathode path, said first resistor, the anode to cathode path of said first tunnel diode and the anode to cathode path of said first switching diode being coupled in series between another terminal of said source of current and said conductive element, said second resistor, the anode to cathode path of said second tunnel diode and the anode to cathode path of said second switching diode being coupled in series between said another terminal of said source of current and said conductive element, said first and second input terminals being coupled to the cathodes of said respective first and second tunnel diodes and said first and second output terminals being coupled to the anodes of said respective first and second tunnel diodes, said source of constant current providing a current flow so that one of said first and second tunnel diodes is normally in a stable low voltage state and the other is in a stable high voltage state, both changing states in response to the signal applied to a selected first or second input terminal.

2. A bistable circuit comprising a source of substantially constant current, first and second current paths coupled in parallel with said current source, each of said first and second paths including a series coupled resistor, tunnel diode and switching diode, first and second input terminals coupled between said switching diode and said tunnel diode of said respective first and second paths, first and second output terminals coupled between said resistor and said tunnel diode of said respective first and second paths, said tunnel diodes each having first and second stable states respectively providing a low voltage drop with a high current flow and providing a high voltage drop with a low current flow, said tunnel diodes responding to said substantially constant current to each assume a different one of said stable first and second states, whereby in response to a pulse applied to said first or second terminal and to the tunnel diode in the first state, said tunnel diode in the first state is triggered to its second state to change the current therethrough so as to trigger the tunnel diode in the second state to its first state, thus applying corresponding voltages to said output terminals.

References Cited in the file of this patent

UNITED STATES PATENTS 2,944,164 Odell et al. ............ July 5, 1961
3,061,743 Fukui et al. ............ Oct. 30, 1962